United States Patent [19]

White et al.

[11] 3,826,926

[45] July 30, 1974

[54] CHARGE COUPLED DEVICE AREA IMAGING ARRAY

[75] Inventors: Marvin H. White, Laurel; Gene Strull, Baltimore, both of Md.

[73] Assignee: Westinghouse Electric Corporation, Pittsburgh, Pa.

[22] Filed: Nov. 29, 1972

[21] Appl. No.: 310,514

[52] U.S. Cl. .......... 307/221, 317/235 B, 317/235 G

[51] Int. Cl. ...................... H03k 21/00, H03k 28/08

[58] Field of Search .................... 317/235 A, 235 G; 307/221 D

[56] References Cited

UNITED STATES PATENTS 3,654,499 4/1972 Smith ................................ 317/235

FOREIGN PATENTS OR APPLICATIONS 2,105,252 4/1972 France .............................. 317/235

OTHER PUBLICATIONS

The Bell System Tech. Journal, "Fabrication and Performance Consideration of Charger–Transfer . . . " by Berglund et al., Mar. 72, pages 655–669.

IEEE Trans. on Elec. Devices, "Charge–Controlled Imaging Devices: Experimental Results" by Tompsett et al., Nov. 1971, pages 992–996.

*Primary Examiner*—Andrew J. James

*Attorney, Agent, or Firm*—D. Schuon

[57] ABSTRACT

A low light level self-scanned high resolution imaging array comprised of charge coupled devices. The charge coupled devices are used as either visible or IR sensors having a polycrystalline silicon transparent conductive gate electrode as well as a two phase stepped oxide aluminum electrode shift register. A unique cell geometry is disclosed together with its method of fabrication which is particularly adapted for an area array making possible low light level sensitivity with "blooming" suppression for use as a solid state TV camera. The entire signal processing and imaging is performed on a single semiconductor substrate preferably comprised of silicon.

8 Claims, 14 Drawing Figures

CHARGE COUPLED DEVICE AREA IMAGING ARRAY

CROSS REFERENCE TO RELATED APPLICATIONS

The present invention is related to U.S. Ser. No. 299,480, now U.S. Pat. No. 3,781,574 entitled "Coherent Sampled Readout Circuit and Signal Processor For a Charge Coupled Device Array," M. H. White, et al. filed on Oct. 20, 1972 and issuing on Dec. 25, 1973. This invention is also assigned to the assignee of the present invention.

BACKGROUND OF THE INVENTION

1. Field of the Invention

This invention relates generally to a solid state photosensitive array and more particularly to a charge coupled device area imaging array having a plurality of cells of a particular geometric configuration arranged in rows and columns on a single silicon wafer.

2. Description of the Prior Art

Solid state image sensors with integrated circuit scan generators offer potential advantages over beam scanned TV camera tubes with respect to cost, reliability, size of camera, color dissipation, operating voltages and range of applications. Previously, solid state scanning has required some form of X-Y address to a mosaic of sensors. The light from the scene is imaged onto a mosaic array of photosensitive elements which results in a pattern of charge depletion across the mosaic sensor. A time varying video signal is then generated by the measurement of the accumulated charge pattern with coincident pulses from peripheral X-Y scan generators.

A serious problem with the operation of mosaic arrays having X-Y address strips arises from the pick-up of spurious switching transients from the horizontal scan generator into the video output signal. The scan pulses normally require several volts amplitude for switching while the video signal levels are usually in the order of millivolts or less. Capacitive coupling into the video output signal is enhanced by the requirement for intersecting address strips and the random variation of rise and fall times produce undesirable low frequency components in the video signal.

Recently, the concept of charge transfer as illustrated in the "bucket-brigade" type of electronics and the "charge-coupled device" (CCD) has made possible an entirely different approach to solid state imaging. The bucket brigade concept is disclosed in a publication entitled "Bucket Brigade Electronics," *IEEE and Solid State Circuits*, SC–4, F. L. J. Sangster and K. Teer, 131 (1969). The concept of the charge coupled device on the other hand is taught in the publication entitled "Charge-Coupled Semiconductor Devices," W. S. Boyle, and G. E. Smith, *Bell Systems Technical Journal*, 49; 587 (1970). In this new technology instead of addressing each sensor element with coincident X-Y pulses, the charge pattern in each row is transferred step wise to the edge of the mosaic array. Once the charge pattern arrives at the edge of the array it is multiplexed into a low noise amplifier or serially transferred to a buffer storage mosaic for subsequent readout. The video pickup is reduced in the charge transfer device because the signals are handled in terms of charge rather than voltage. As such a large cross over capacitance heretofore required are eliminated and more effective filtering can be performed by the low pass filters since the number of low frequency components are reduced.

Even with the advent of such charge transfer devices, there are still formidable problems in the realization of low light level self-scanned area arrays. For example, to realize a high resolution, solid state camera compatible for TV use, a 512 × 512 element area array is required with an image size roughly 1 inch by 1 inch including peripheral address and readout circuitry. This prohibits the use of a buffer storage mosaic from the standpoint of space limitations and circuit complexity. The use of the sensor elements themselves as the serial shift register introduces system lag and cross talk with no solution of the lateral charge spreading or "blooming" problem.

SUMMARY

Accordingly, the present invention is directed to the method and apparatus for providing a sensor cell particularly adapted for providing a low level, self-scanned photosensitive device area array. Each sensor cell includes an active sensor element comprised of a transparent silicon gate CCD device, P-N junction or a photosensitive diode and an associated CCD transfer gate, a stopper diffusion region which prevents blooming, and a stepped oxide, overlapping electrode two phased CCD shift register stage which receives mobile minority charge carriers from the sensor element by means of the transfer gate. The shift register and the transfer gate have a respective mutually parallel aluminum conductor lines transversely spanning the cell and being common to all cells in a specific row of the array. The two phase conductor lines moreover, are formed from depositions of aluminum electrode material on different layers of dielectric material ($SiO_2$) with suitable windows and metallization therethrough for configuring an overlapping electrode structure so that a parallel readout of all active sensor elements in a row can be had to the respective shift register stage with a subsequent serial readout to the edge of the array where each charge packet is then transferred to a column transfer line and serial CCD shift register coupled to a CMOS readout circuit.

BRIEF DESCRIPTION OF THE DRAWINGS

FIG. 4A is a partial cross sectional view, 4C and 4D are partial cross sectional views taken along the respective lines in FIG. 4B while FIG. 4B is a partial plan view, all views being illustrative of the third step of fabricating the structure shown in FIG. 1;

FIG. 5A is a partial plan view and FIG. 5B is a partial cross sectional view taken long lines 5B—5B of FIG. 5A, being illustrative of the fourth step in fabricating the preferred embodiment of the subject invention;

FIG. 6A is a partial plan view and FIG. 6B is a partial cross sectional view taken along the lines 6B—6B of FIG. 6A and being illustrative of the fifth step in the process of fabricating the structure according to the subject invention.

DESCRIPTION OF THE PREFERRED EMBODIMENT

By way of additional background information, charge coupled devices (CCD) create and store minority carriers or their absence in potential wells which are spatially defined regions where depletion is momentarily deepened at the interface between a homogeneous semiconductor and oxide insulator. Once stored, the charge coupled to the potential well can be moved over the surface of the semiconductor simply by moving the potential well by means of suitably applied control signals. The process of accumulating a charge on a semiconductor by way of optical injection into a two dimensional array, transferring the charge from each imaging area and providing an output comprised of a series of pulses whose envelopes are the video analog of the image forms the basis of the subject invention.

Figure 1:
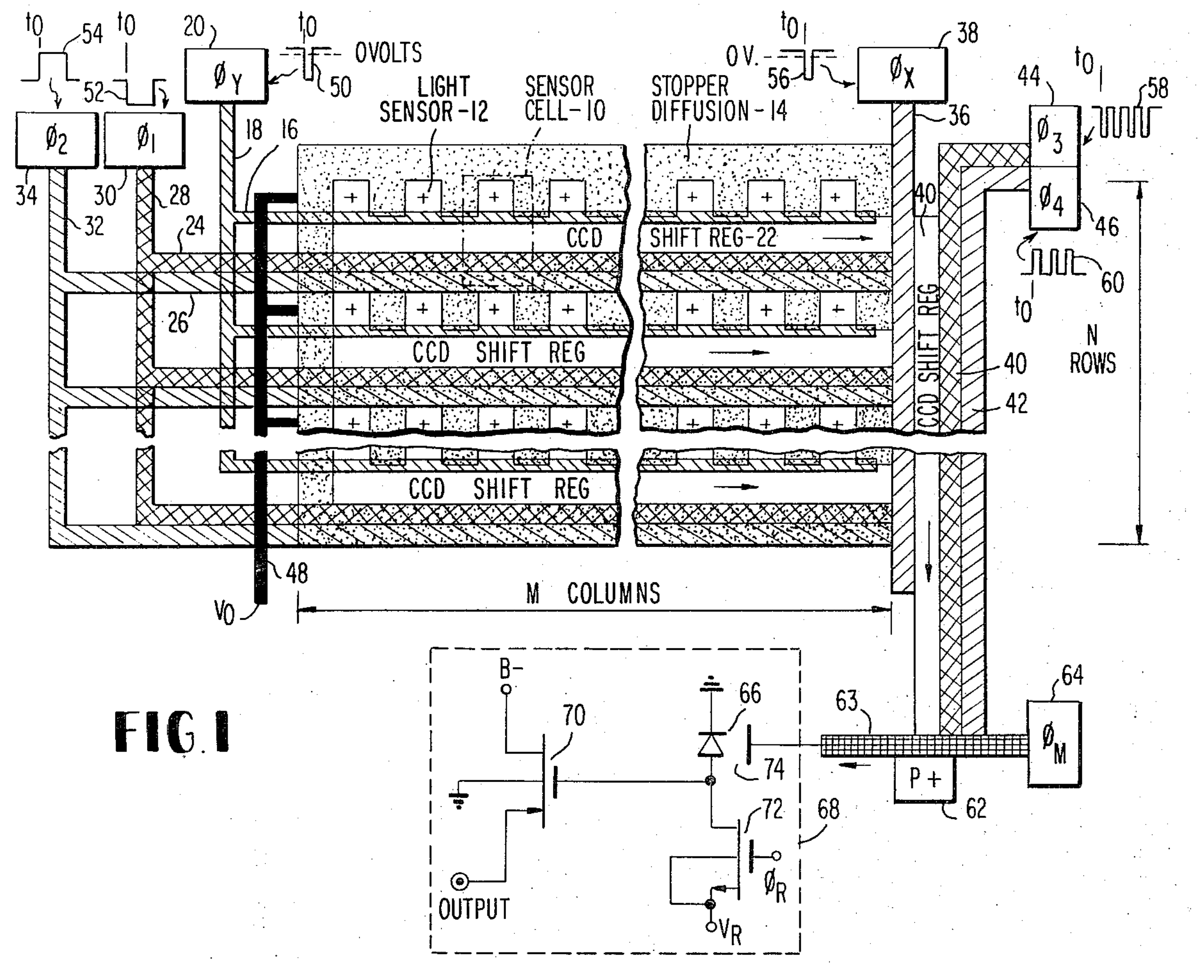
FIG. 1 is a block diagram illustrative of an area imaging array according to the present invention.

Referring now to the drawing and particularly to FIG. 1, there is disclosed a block diagram of an area imaging array comprised of a plurality of semiconductor sensor cells 10 arranged in M columns and N rows. Each sensor cell 10 includes, inter alia, a light sensor element 12 which is preferably a CCD device of a generally quadrilateral configuration having a transparent polycrystalline silicon gate electrode and wherein a semiconductor stopper diffusion region 14 surrounds three sides of the sensor element. When desirable, a P-N junction or a photodiode can replace the CCD sensor element. The remaining side of the sensor element 12 is traversed by a transfer gate conductor line 16 spanning all of the cells 10 of a particular row. This is shown in FIG. 1 by means of a horizontally disposed conductor line integral with a vertical conductor line 18 connected to a line transfer gate pulse $\phi_Y$ generator 20. Adjacent the transfer gate conductor line 16 of each sensor cell 10 is one stage or bit, not shown, of a stepped oxide two phase overlappling electrode CCD serial shift register 22 which is controlled by antiphase (mutually 180° out of phase) control pulse signals respectively applied to a first phase $\phi_1$ conductor line 24 and a second phase $\phi_2$ conductor line 26 running mutually parallel to each other as well as the transfer gate conductor line 16. The phase conductor lines 24 and 26 while parallel to one another are offset from each other and are located on different levels of the semiconductor structure as will be shown in detail below.

The first phase conductor line 24 is integral with a vertical conductor line 28 which couples to a $\phi_1$ pulse generator 30 while the second phase conductor line 26 is integral with a corresponding vertical conductor line 32 which is connected to a $\phi_2$ pulse generator 34. The transfer gate conductor line 16 operates to control the parallel transfer of minority carrier packets from all of the sensor elements of a particular row to its respective shift register bit while $\phi_1$ and $\phi_2$ conductor lines 24 and 26 serially step each individual charge packet in the shift register 22 to a second transfer gate conducting line 36 running along the right hand edge of the array. The conducting line 36 is coupled to a second transfer gate pulse $\phi_X$ generator 38. Another two phase overlapping electrode CCD shift register 40 is fabricated adjacent the transfer line 36 and is controlled by a third and fourth phase $\phi_3$ and $\phi_4$ conductor lines 40 and 42 respectively coupled to pulse generators 44 and 46. Additionally, another conductor line 48 is connected to the array as will be explained when reference is made to FIGS. 4A–4D to which is applied a bias voltage $V_o$ which serves to control the maximum amount of collected charge at each sensor element 12 such that subsequent signal processing will not result in charge spreading along the M elements in any given row. A slightly positive potential is also applied to the transfer gate conductive line 18 during the non-transfer time as shown by waveform 50 which has the effect of creating a stopper semiconductivity region thereunder which also inhibits charge spreading or "blooming" from that region of the sensor element 12.

Assuming that the array is fabricated on an N-type silicon semiconductor wafer or substrate, the negative going portion of pulse 50 generated by the $\phi_Y$ pulse generator 20 causes all of the charge collected in each of the sensor elements 12 in response to light radiation impinging thereon to be transferred to the corresponding or respective bit in the serial shift register 22. For example, the $jk^{th}$ element ($j^{th}$ row, $k^{th}$ column) will transfer to the $k^{th}$ bit location of the $j^{th}$ serial shift register. Once the transfer pulse 50 is disabled, the image sensor is automatically reset at the reference voltage $V_o$. The information in the serial shift register 22 is transferred to the right edge of the array with the $\phi_1$ and $\phi_2$ clock pulse signals 52 and 54 wherein the $\phi_1$ pulse 52 is first a negative going pulse in synchronism with a negative going transfer pulse 50 while the $\phi_2$ pulse 54 is a positive going pulse. The frequency of the $\phi_1$ and $\phi_2$ pulses 52 and 54 can be expressed by the relationship:

$$f_{horiz.} = M/T_f \quad (1)$$

Where $T_f$ is the frame time and $M$ is the number of columns in the array.

As each charge packet of the row reaches the last bit of the shift register 22, it is transferred in parallel with the other rows by means of pulse 56 to the shift register 40 where it is clocked by $\phi_3$ and $\phi_4$ pulses 58 and 60 from the pulse generators 44 and 46, respectively, and having a frequency N times that of pulses 52 and 54, that is:

$$f_{vert.} = Nf_h = NM/T_f, \quad (2)$$

where $N$ is the number of rows in the array. The shift register 40 is thus able to sequentially transfer all of the charge packets of the N rows to an output device 62 each time the charge packets are shifted one bit to the right in the M columns.

The last bit of the shift register 40 transfers its charge packet to a transfer line 63 pulsed by means of a multiplexing pulse $\phi_M$ generator 64 which transfers the packets to a reverse biased collecting diode 66 in a readout circuit 68. The details of the readout circuit 68 are covered in the aforementioned cross referenced related application, Ser. No. 299,480 now U.S. Pat. No.

3,781,574. Briefly, however, the readout circuit 68 operates in the following manner: (1) The gate of the P channel MOSFET device 70 is referenced to the voltage $V_r$ applied to the source of the N channel MOSFET device 72 by the application of a control signal $\phi_R$ to the gate thereof. (2) Following this the reference or "dark" level condition is "read" by means of an external amplifier circuit connected to the source of the MOSFET device 70. (3) Next the information from the individual CCD sensor element 12 is multiplexed into the collecting diode 66 through a switch device 74 controlled by the signal $\phi_M$ applied from the pulse generator 64. (4) The final interval of time is used to "read" the signal level injected into the collecting diode 66, which signal level consists of the signal charge plus the reference level and wherein the action of "reading" the signal is to subtract the readings of (2) and (4) such that only the signal remains. Reference to the aforementioned related application should be resorted to for a more complete discussion of the operation of the readout circuit 68.

Figure 7:
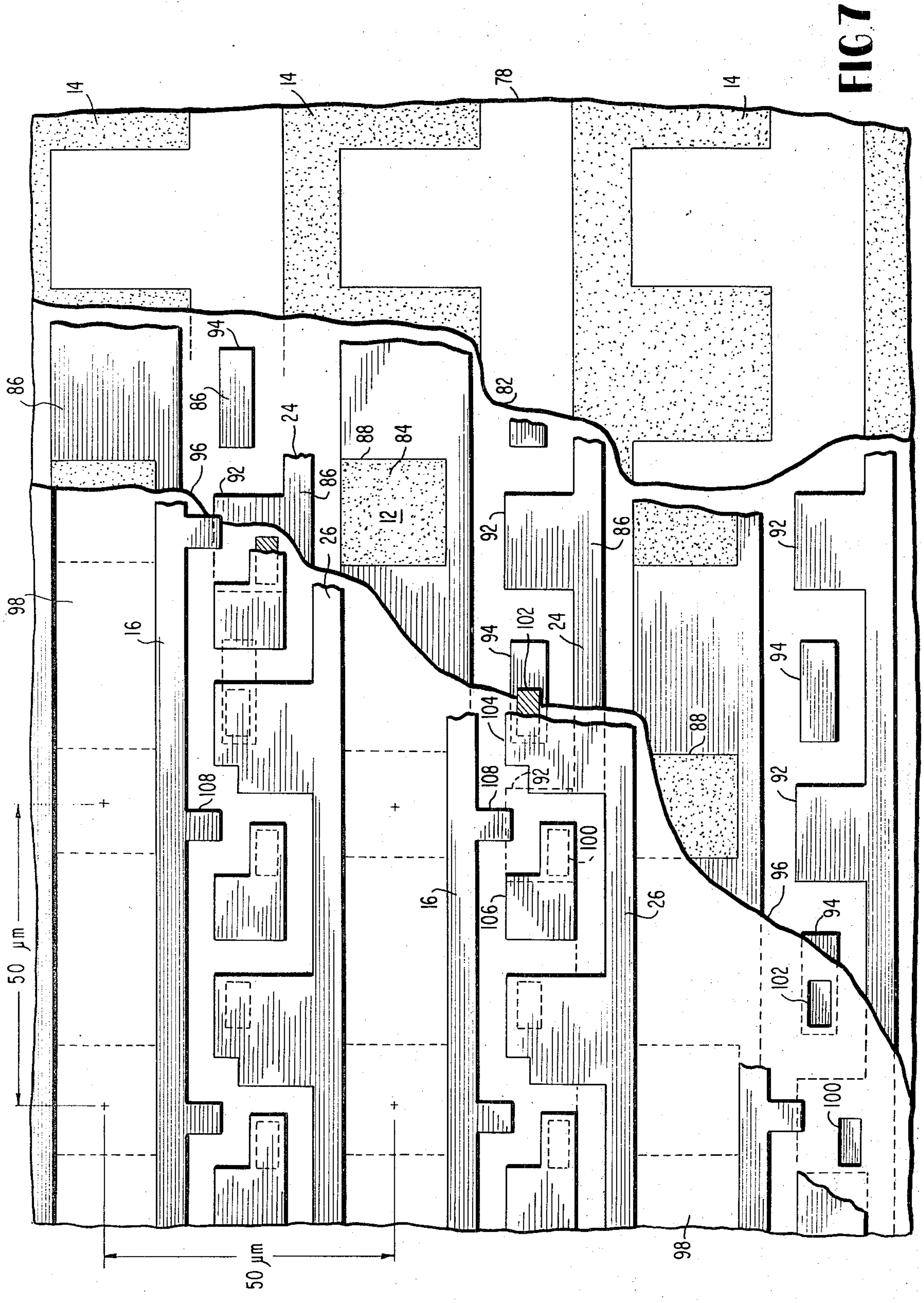
FIG. 7 is a plan view of the composite structure partially broken away to reveal the configuration of elements at various levels of the array shown in FIG. 1.

Referring now to the geometrical configuration of the sensor cells 10, they are shown in FIG. 7 which discloses a cutaway plan view of various layers of materials making up the array and in FIGS. 2 through 6 which discloses their method of fabrication. As noted above, each sensor cell 10 includes a radiation sensitive semiconductive element 12 partially surrounded by a stopper diffusion region 14, a transfer gate 16 comprised of electrode material located adjacent the sensor element and one bit of a two phase stepped oxide overlapping electrode shift register bit 22. The geometry of the cell itself permits sensor element to sensor element spacing to be compatible with present high density requirements and can best be explained in terms of the steps in its method of fabrication.

Figure 2:
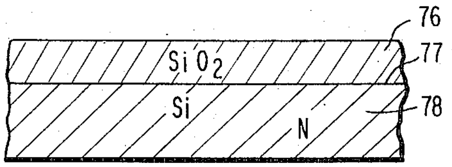
FIG. 2 is a partial cross sectional view schematically illustrating the first step in the process of fabricating an area array in accordance with the preferred embodiment of the subject invention.
Figure 3B:
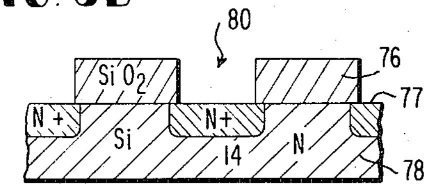
FIG. 3A is a partial plan view and FIGS. 3B–3C are partial cross-sectional views taken along lines 3B—3B of FIG. 3A, being illustrative of the second step in the process of fabricating the array shown in FIG. 1.
Figure 3A:
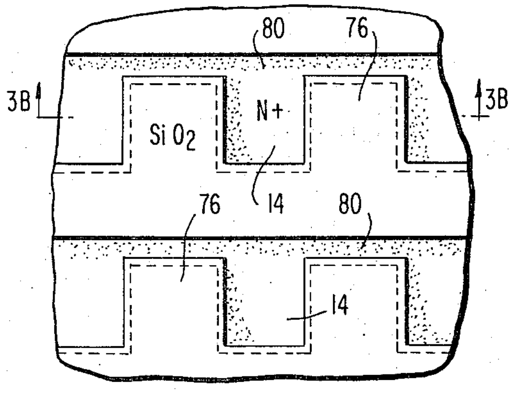
Figure 3C:
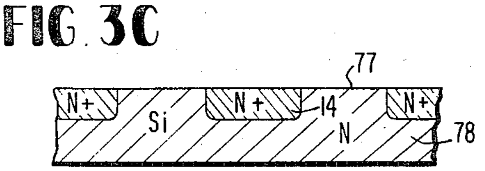

Considering now FIG. 2, the first step in the fabrication of the imaging array consists in forming by means of suitable growing techniques an insulating or dielectric layer 76 of silicon dioxide ($SiO_2$) over the surface 77 of a N-type substrate 78 of semiconductor material such as silicon. Following this, an opening pattern 80 as shown in FIGS. 3A and 3B is formed in the $SiO_2$ layer 76 to define a stopper diffusion region 14 whereupon a diffusion of N+ semiconductive material is carried out by well known techniques into the surface 77 of the silicon substrate 78 as shown in FIG. 3B. The stopper diffusion pattern is such that it forms a complete border around the complete array shown in FIG. 1 and surrounds each light sensor element 12 on three sides. Following the stopper diffusion process, the remainder of the layer 76 of $SiO_2$ is removed as shown in FIG. 3C, leaving a diffusion pattern such as shown in FIG. 3A.

Figures 4A, 4B, 4C, 4D, 5A, 5B, 6A, 6B:
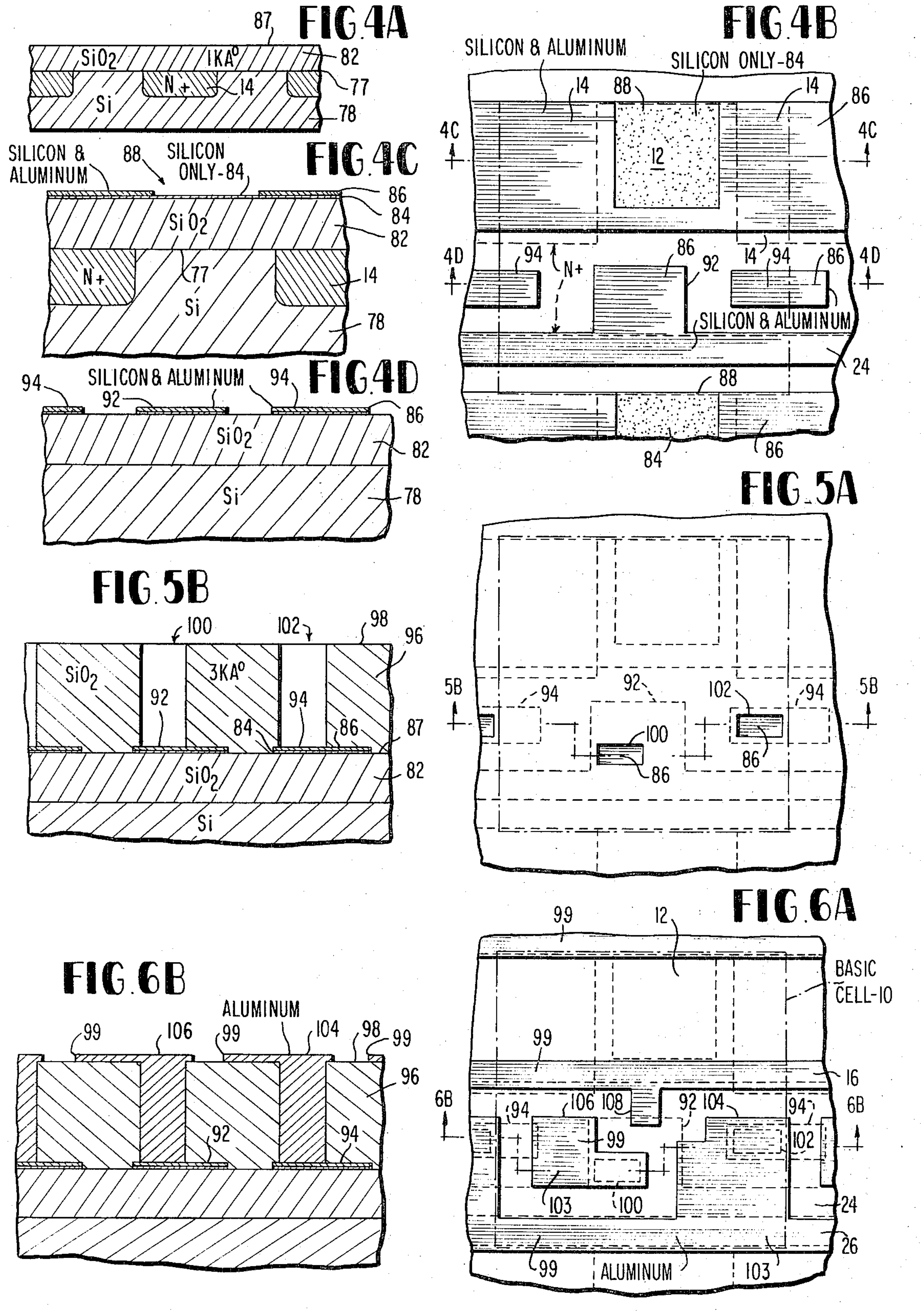

Next a new layer 82 of $SiO_2$ is formed over the surface 77 of the substrate 78 and being in the order of 1kA thick as shown in FIG. 4A. Following the growth of the dielectric layer 82, a thin film in the order of 1–2 kA thick of transparent polycrystalline silicon 84 followed by a deposition of electrode material 86 such as aluminum is formed over the surface 87 of the $SiO_2$ layer 82. The aluminum electrode material is removed from the generally rectangular area 88 shown in FIGS. 4B leaving only the silicon film to define an aperture for a light sensitive CCD element 12 formed at the interface between the substrate 78 and the dielectric layer 82. It is to the silicon gate electrode material 86 that the bias line 48 for $V_o$ is connected. Additionally, both the silicon film and aluminum layer 86 are etched away to provide the $\phi_1$ conductor line 24 which also has a relatively large generally square electrode area 92 projecting inwardly therefrom towards the sensor element 12. A relatively smaller elongated isolated electrode area 94 having a width substantially equal to the width of the conductor line 24 is etched out adjacent the electrode area 92, running parallel to the conductor line 24 as illustrated in FIG. 4B. FIG. 4D which is a cross section through the lines 4D–4D further illustrates this etching pattern and also indicates that there is no stopper diffusion in the region.

Having defined the aperture 88, the $\phi_1$ conducting line 24 running transversely across the cell 10 beneath the sensor element 12 together with electrode areas 92 and 94 still another $SiO_2$ layer 96 in the order of 3kA thick is next formed over the $SiO_2$ layer 82 and the first electrode metallization pattern shown in FIG. 4B. Openings or windows 100 and 102 are respectively formed through the dielectric layer 96 over the projecting electrode area 92 and the isolated electrode area 94 as shown in FIGS. 5A and 5B.

A second metallization step is next performed wherein a layer 99 of electrode material (aluminum) is deposited over the outer surface 98 of the dielectric layer 96 and through the openings 100 and 102 down to the electrode areas 92 and 94 as shown in FIG. 6B. A conductor pattern is etched on the surface of the dielectric layer 98 as shown in FIG. 6A. The metallization pattern comprises the $\phi_2$ conductor line 26 having a relatively large generally square projecting electrode area 104 disposed over the underlying isolated electrode area 86 and slightly overlapping the underlying projected electrode area 92 disclosed in FIGS. 4B–4D. A second generally L shaped isolated electrode area 106 is also etched parallel to the conductor line 26 adjacent the projection electrode area 104 and is situated partially above the underlying projection electrode area 92 and slightly overlapping the underlying isolated electrode area 94. What is formed thereby is an overlapping electrode or stepped oxide CCD shift register stage which has the respective $\phi_1$ and $\phi_2$ control signals 52 and 54, respectively applied to parallel conductor lines 24 and 26 located on different metallization levels and being offset with respect to one another.

Also, the second metallization etching procedure fabricates the charge transfer conductor line 16 shown in FIG. 1 which runs transversely of the sensor element 12 and parallel to the conductor lines 24 and 26 and being located between the photoconductive sensor element and the CCD shift register bit. The transfer conductor line 16 also includes an electrode projection 108 which is disposed outwardly towards the shift register bit between the projecting electrode area 104 and the L shaped isolated electrode area 106, extending until it slightly overlaps the underlying projection electrode area 92 beneath it at the first metallization level as shown in FIG. 6A.

FIG. 7 shows a cut-away view of a composite structure made up of the two $SiO_2$ dielectric layers 82 and 96 formed on the N-type silicon substrate 78 with a first metallization being provided between the contiguous surfaces of the dielectric layers 82 and 96 and a second metallization being provided on the top surface 98 of the dielectric layer 96. The interdigited projection electrode areas 92 and 104 at different levels together with the isolation electrode areas 94 and 106 and the metallization feedthroughs provided through the windows 100 and 102 configure the shift register with the two phase conducting lines 24 and 26 running adjacently parallel thereto. The transfer conductor line 16 together with its projecting portion is adapted to couple the respective charge packet from the light sensor element 12.

When desirable interlaced scanning for "flickerfree" presentation and reduction of aliasing in imaging can be achieved by ANDing the transfer gate(s) 16 with the $\phi_1$ and $\phi_2$ clock signals by means of suitable logic gates, not shown, in the following manner: In interlaced scanning there are normally 2 fields per frame, the odd field and the even field. During the odd field the odd numbered elements in each row would be ANDed with the clock signal $\phi_1$ in one exposure time while the even numbered elements would be ANDed with clock signal $\phi_2$ in the next exposure time. Thus two field exposure times would constitute a frame time and there would always be a "blocking well" between sensor elements in each field exposure time.

The simplicity of the cell design uses the special properties of polycrystalline silicon to provide a transparent conductive gate electrode for a photosensitive CCD sensing element which allows sensor to sensor spacing to be compatible with high density requirements. For example, with conductor linewidths and spacings of $5\mu m$. ($10^{-6}$ meters) the center to center spacings of the sensor elements is in the order of $50\mu m$. for a sensor area in the order of $20\mu m$. on a side thus permitting CCD area sensing arrays to be designed and fabricated with TV resolution and scan times.

Having disclosed what is at present considered to be the preferred embodiment of the subject invention together with its method of manufacture,

We claim as our invention:

1. A semiconductor area imaging array including a plurality of sensor cells arranged in rows and columns, wherein each cell comprises in combination:

a substrate of semiconductor material of selected semiconductivity type having a semiconductor stopper diffusion region adapted to at least partially surround a discrete radiation sensor region;

a first layer of dielectric material overlying said substrate;

a polycrystalline silicon radiation sensitive semiconductor element having a transparent conductive gate electrode, fabricated at said radiation sensor region, providing a carrier distribution in response to incident radiation impinging thereon and having radiation masking material comprising first electrode material on said first layer of dielectric material selectively around the periphery of said sensor element;

an overlapping electrode two phase charge coupled device (CCD) shift register bit located adjacent said radiation sensitive semiconductive element and comprising, a. first electrode material fabricated on said irst layer of dielectric material, said first electrode material thereat being configured as a first phase $\phi_1$ conductor line of predetermined width running substantially parallel to and separated from said one dimension of said radiation sensitive semiconductor element and having a first electrode area projecting therefrom toward said one dimension of said semiconductor element, said first electrode area being of generally rectangular configuration having a length dimension substantially equal to three times the width of the $\phi_1$ conductor line and a width dimension substantially equal to twice the width of the $\phi_1$ conductor line, and a second but isolated electrode area adjacent said first electrode area and situated between said $\phi_1$ conductor line and said one dimension, said second electrode area being separated from said first electrode area and said $\phi_1$ conductor line by a distance at least equal to the width of the $\phi_1$ conductor line and having a generally rectangular configuration, with a length dimension substantially parallel to said $\phi_1$ conductor line and substantially equal to three times the width of the $\phi_1$ conductor line and a width dimension substantially equal to the width of the $\phi_1$ conductor line, b. a second layer of dielectric material overlying said first layer of dielectric material and electrode material, said second layer of dielectric material having selective openings therethrough to said first and second electrode areas, c. said second electrode material being configured as a second phase $\phi_2$ conductor line having a width substantially equal to the width of the $\phi_1$ conductor line and running substantially parallel to and adjacently offset from the underlying $\phi_1$ conductor line in a direction away from said one dimension and having a third electrode area projecting toward said one dimension over said $\phi_1$ conductor line, being disposed intermediate but overlapping a portion of the underlying first and second electrode areas, said third electrode area being of a generally rectangular configuration with a notched corner of predetermined size and having edge dimensions exclusive of said notched corner substantially equal to three times the width of the $\phi_2$ conductor line with said notched corner being located toward said one dimension of said radiation element and with an adjoining edge thereto of said third electrode area slightly overlapping said first electrode area and a fourth but isolated electrode area adjacent said third electrode area and situated between said $\phi_2$ conductor line and said one dimension, being disposed intermediate but also overlapping another portion of the underlying first and second electrode areas, said fourth electrode area being separated from said third electrode area and said $\phi_2$ conductor line by a distance substantially equal to the width of the $\phi_2$ conductor line, having a generally L-shaped configuration comprised of a first and second portion having a combined length dimension substantially parallel to said $\phi_2$ conductor line and substantially equal to four times the width of the $\phi_2$ conductor line, said first portion being of a relatively smaller size portion pointing toward the edge of said third electrode area including the notched corner and extending over said first electrode area, having a width dimension substantially equal to the width of said $\phi_2$ conductor line and a length substantially twice the width of said $\phi_2$ conductor line, said second portion having a width dimension substantially equal to twice the width of said $\phi_2$ conductor line and a length sufficient to slightly overlap said first electrode area in one direction and said second electrode area in the other direction;

a first metallization feedthrough from said first portion of said fourth electrode area through an opening in said second layer of dielectric material to said first electrode area;

a second metallization feedthrough from said third electrode area adjacent said notched corner through an opening in said second layer of dielectric material to said second electrode area, said feedthroughs in combination with said electrode areas associated with each of the two conductor lines providing a two phase stepped oxide shift register; and a carrier transfer conductor line comprised of second electrode material on said second dielectric layer located adjacent said radiation sensitive semiconductive element and separated from said shift register bit a distance substantially equal to the width of the $\phi_1$ and $\phi_2$ conductor lines, said transfer conductor line being configured as a conductor line running substantially parallel to and being substantially equal in width to said first and second phase conductor lines and including a fifth electrode area having a width substantially equal to the width of said transfer conductor line projecting therefrom towards said shift register bit intermediate the notched corner of said third electrode area and said first portion of said fourth electrode area and having a length sufficient to extend over the underlying first electrode area.

2. The sensor cell as defined in claim 1 wherein said semiconductor stopper diffusion comprises a difussion of relatively greater concentration of like semiconductivity relative to the semiconductivity of said substrate and wherein said stopper diffusion surrounds substantially three quarters of said sensor region.

3. The sensor cell as defined by claim 2 wherein said sensor region comprises a quadrilateral region wherein said stopper diffusion substantially surrounds three sides thereof and wherein said carrier transfer conductor line spans the fourth side of said sensor region.

4. The sensor cell as defined in claim 1 wherein said radiation sensitive semiconductive element comprises a charge coupled device comprised of said substrate, said first layer of dielectric material and additionally including a transparent layer of polycrystalline silicon overlying said layer of insulating material.

5. The sensor cell as defined by claim 1 wherein said first electrode material comprises a film of silicon and an overlay of aluminum and said second electrode material comprises a layer of aluminum.

6. The sensor cell as defined by claim 5 and additionally including means coupling antiphase clock signals respectively to said first and second phase conductor line, means coupling a bias voltage to said aluminum overlay of said masking material for controlling the maximum amount of charge collected at said radiation sensitive element, and additionally including means coupled to said transfer line for applying a bias potential thereto which generates a diffusion region thereunder of the same semiconductivity type as said stopper diffusion region and being clocked periodically in synchronism with said antiphase clock signals to transfer carries from said sensor element to said shift register bit.

7. The sensor cell as defined by claim 6 wherein said substrate is comprised of silicon and said first and second layer of dielectric material is comprised of silicon dioxide.

8. The sensor cell as defined by claim 7 wherein said substrate is comprised of N-type silicon and said stopper diffusion region is comprised of N+ semiconductor material.

* * * * *